(12) United States Patent
Fujimura et al.

(10) Patent No.: US 9,061,266 B2
(45) Date of Patent: Jun. 23, 2015

(54) EXHAUST GAS PURIFYING CATALYST

(71) Applicant: N.E. CHEMCAT CORPORATION, Minato-ku, Tokyo (JP)

(72) Inventors: Takehiro Fujimura, Shizuoka (JP); Yoshinori Takahashi, Shizuoka (JP)

(73) Assignee: N.E. CHEMCAT CORPORATION, Tokyo (JP)

(*) Notice: Subject to any disclaimer, the term of this patent is extended or adjusted under 35 U.S.C. 154(b) by 0 days.

(21) Appl. No.: 14/343,586

(22) PCT Filed: Sep. 25, 2012

(86) PCT No.: PCT/JP2012/074499
§ 371 (c)(1),
(2) Date: Mar. 7, 2014

(87) PCT Pub. No.: WO2013/065421
PCT Pub. Date: May 10, 2013

(65) Prior Publication Data
US 2015/0045209 A1    Feb. 12, 2015

(30) Foreign Application Priority Data
Oct. 31, 2011  (JP) ................. 2011-238118

(51) Int. Cl.
*B01J 23/46* (2006.01)
*B01J 27/053* (2006.01)
(Continued)

(52) U.S. Cl.
CPC ............. *B01J 27/053* (2013.01); *B01D 53/945* (2013.01); *B01D 2255/1021* (2013.01);
(Continued)

(58) Field of Classification Search
CPC ..... B01J 23/464; B01J 27/055; B01J 27/0553

USPC .......................................... 502/223
See application file for complete search history.

(56) References Cited

U.S. PATENT DOCUMENTS

2009/0298675 A1  12/2009  Takeshima et al.
2011/0047975 A1* 3/2011  Nakayama et al. ............. 60/274

FOREIGN PATENT DOCUMENTS

EP  1 053 779 A1  11/2000
JP  3-106446 A    5/1991
(Continued)

OTHER PUBLICATIONS

International Search Report dated Dec. 11, 2012 issued in corresponding application No. PCT/JP2012/074499.

*Primary Examiner* — Melvin C Mayes
*Assistant Examiner* — James Corno
(74) *Attorney, Agent, or Firm* — Westerman, Hattori, Daniels & Adrian, LLP

(57) ABSTRACT

The invention discloses a catalyst for purifying exhaust gas apparatus having a Three-way Catalyst (TWC) superior in purification performance of, particularly, $NO_x$, among carbon monoxide (CO), hydrocarbons (HC), and nitrogen oxides ($NO_x$), in exhaust gas discharged from a gasoline automobile. It is provided by a catalyst for purifying exhaust gas containing a Rhodium (Rh)-loaded porous inorganic oxide and barium sulfate ($BaSO_4$), with loaded or not-loaded onto alumina. At least a part of Rh is present independently from Ba inside a catalyst layer, and Rh—Ba deviation rate determined from EPMA analysis is 10% to 80%. It is preferable that loaded amount of Rhodium is 0.05 g/L to 2.0 g/L, and amount of barium sulfate is 0.5 g/L to 25 g/L and 0.5 g/L to 15 g/L, in the case of being loaded or not-loaded onto alumina, respectively.

8 Claims, 6 Drawing Sheets

(51) Int. Cl.
*B01D 53/94* (2006.01)
*B01J 37/02* (2006.01)
*B01J 23/58* (2006.01)
*B01J 23/63* (2006.01)
*B01J 35/00* (2006.01)

(52) U.S. Cl.
CPC ............ *B01D 2255/1023* (2013.01); *B01D 2255/1025* (2013.01); *B01D 2255/2042* (2013.01); *B01D 2255/407* (2013.01); *B01D 2255/9022* (2013.01); *B01D 2255/9025* (2013.01); *B01D 2255/9202* (2013.01); *B01D 2255/9205* (2013.01); *B01D 2255/9207* (2013.01); *Y02T 10/22* (2013.01); *B01J 37/0244* (2013.01); *B01J 23/58* (2013.01); *B01J 23/63* (2013.01); *B01J 35/006* (2013.01); *B01J 23/464* (2013.01)

(56) References Cited

FOREIGN PATENT DOCUMENTS

| | | |
|---|---|---|
| JP | 5-237390 A | 9/1993 |
| JP | 6-75675 B2 | 9/1994 |
| JP | 9-215922 A | 8/1997 |
| JP | 11-151439 A | 6/1999 |
| JP | 2001-79355 A | 3/2001 |
| JP | 2002-326033 A | 11/2002 |
| JP | 2007-319768 A | 12/2007 |
| JP | 2010-22918 A | 2/2010 |
| WO | 00/27508 A1 | 5/2000 |

\* cited by examiner

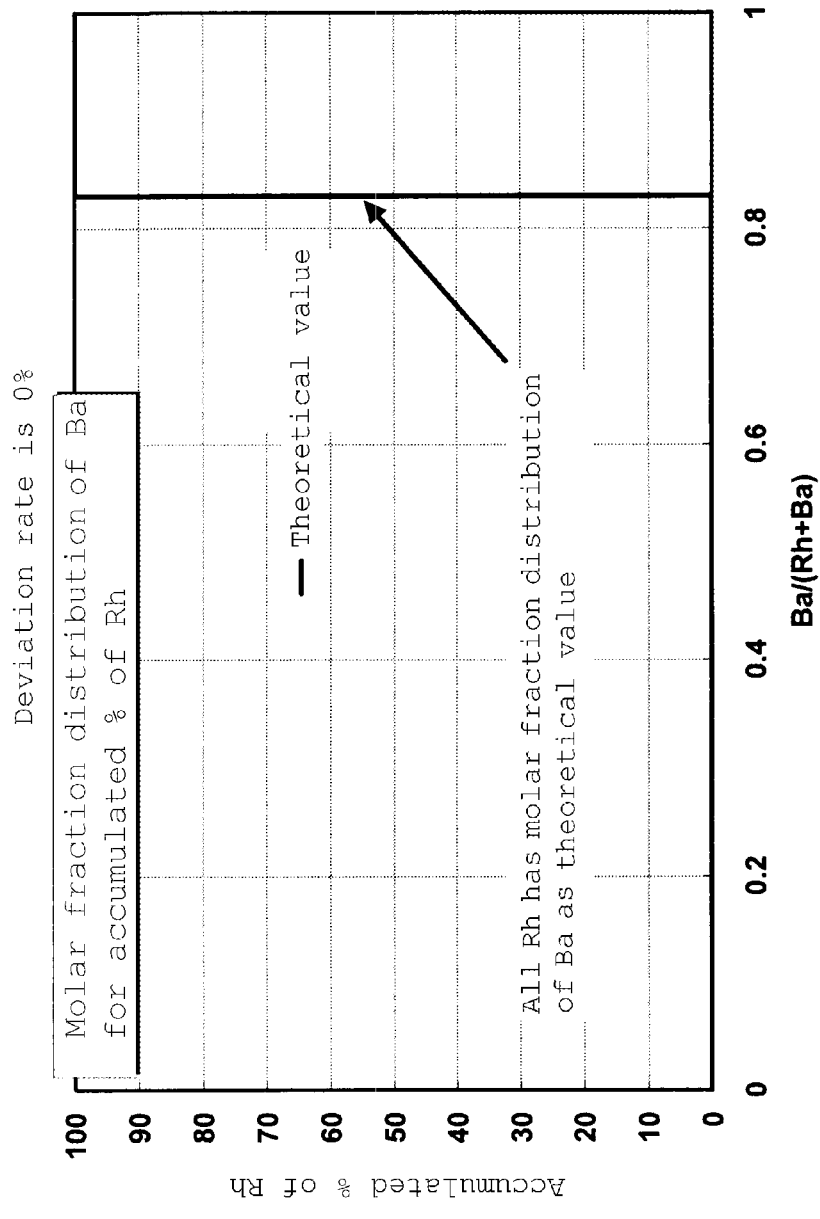

(B): The case where deviation rate is 100%

EXHAUST GAS PURIFYING CATALYST

TECHNICAL FIELD

The present invention relates to a catalyst for purifying exhaust gas, in more detail, a catalyst for purifying exhaust gas suitable as a Three-way Catalyst (TWC) superior in purification performance of nitrogen oxides ($NO_x$) in exhaust gas discharged from a gasoline automobile.

BACKGROUND ART

In a catalyst apparatus for purifying an exhaust gas discharged from an internal-combustion engine of an automobile or the like, various catalysts have been used depending on object thereof. As a major catalyst component thereof, there is included platinum group metals, and usually it is used by loading, in high dispersion, onto a refractory inorganic oxide having high surface area of activated alumina or the like (refer to PATENT LITERATURE 1).

As the platinum group metals as the catalyst component, there have been known platinum (Pt), palladium (Pd), and rhodium (Rh), which have been used widely as the catalyst for purifying exhaust gas discharged from an internal-combustion engine of an automobile or the like. In the aforementioned TWC, a catalytically active species superior in oxidation activity, of Pt, Pd or the like, and Rh superior in purification activity of $NO_x$, are used in combination, in many cases. In recent years, regulations on hazardous substances contained in exhaust gas, in particular, regulations on $NO_x$, have become more and more severe. Accordingly, it is necessary to effectively use Rh superior in purification activity of $NO_x$. In addition, Rh is scarce in production and of high price, which has caused price hike in recent market. Therefore, it is preferable to decrease used amount of Rh as a catalytically active species, in view of resource protection as well as cost.

In addition, in the catalyst for purifying exhaust gas, in order to achieve the enhancement of still more purification performance, the addition of various promoter components, other than platinum group metals, to the catalyst has been investigated. As these promoter components, an Oxygen Storage Component (OSC), or an alkaline earth metal, or zirconium oxide, zeolite and the like have been known.

Among these, OSC stores and releases oxygen in exhaust gas, and cerium oxide has been known as an OSC. Cerium oxide stores oxygen as $CeO_2$, when oxygen concentration is high in exhaust gas, and releases oxygen by being converted to $Ce_2O_3$, when oxygen concentration is low. Oxygen released is active and it promotes purification of HC and CO, by being utilized in oxidation action by Pt or Pd. In addition, OSC also serves to buffer oxygen concentration change in exhaust gas, by storage and discharge of oxygen. By this action, purification performance of exhaust gas is enhanced in TWC. TWC is a catalyst which performs both oxidation and reduction, and has a range of exhaust gas components suitable for purification, in view of designing. This range depends on air/fuel ratio in many cases. Such a range is called a window, and in many cases, exhaust gas combusted at the neighborhood of theoretical air-fuel ratio, so-called stoichiometric ratio, is set as the window region. By being buffered change in oxygen concentration in exhaust gas, this window region can be maintained for a long period of time, and purification of exhaust gas is performed effectively. This is said to influence particularly on purification characteristics of $NO_x$ by Rh.

As such a cerium oxide, although a pure cerium oxide can be used, a composite oxide with zirconium is often used (refer to PATENT LITERATURE 2). A cerium-zirconium composite oxide is said to have high heat resistance and high storage and release rate of oxygen. It is believed because a crystal structure of the cerium-zirconium composite oxide is stable, and it does not inhibit the action of a cerium oxide, which is a main OSC component, thus all parts including inside of the particle can be utilized for action as the OSC.

On the other hand, in purification of $NO_x$ by Rh, it is considered that, for example, a steam reforming reaction or a (CO+NO) reaction is promoted via the Rh component as shown below and to purify $NO_x$.

$$HC + H_2O \longrightarrow CO_x + H_2 \tag{1}$$

$$H_2 + NO_x \longrightarrow N_2 + H_2O \tag{2}$$

$$CO + NO \longrightarrow CO_2 + \tfrac{1}{2}N_2 \tag{3}$$

And, it is known that the zirconium oxide promotes the steam reforming reaction and the (CO+NO) reaction, when used together with the Rh component (refer to PATENT LITERATURE 3).

As other promoter component, an alkaline earth metal such as the Ba component has also been known (refer to PATENT LITERATURE 4). The Ba component is converted to $Ba(NO_3)_2$ by temporarily storing $NO_x$ contained in exhaust gas, and after that purifies the stored $NO_x$ by reducing to $N_2$ by a reducing component contained in exhaust gas.

In general, $NO_x$ is generated in a large quantity, when fuel supplied to an engine is less, and amount of air is more, and combustion temperature is high. The Ba component thus temporarily absorbs $NO_x$ generated.

$NO_x$ absorbed onto the Ba component is discharged from the Ba component when $NO_x$ concentration in exhaust gas becomes low and carbon dioxide ($CO_2$) concentration becomes high. This is caused by reaction of the above-mentioned $Ba(NO_3)_2$ with carbon dioxide gas under co-existence of steam, to be converted to $BaCO_3$, which occurs towards the chemical equilibrium. $NO_x$ discharged from the Ba component, as described above, is purified by reduction, by reacting with a reducing component at the Rh component surface.

Such a promoter component can also be used in combination of two or more materials and, for example, TWC has been known where the Ba component and cerium oxide are used (refer to PATENT LITERATURE 5). However, purification performance can be decreased depending on combination of catalyst materials: for example, it has been reported that presence of the Rh component and the Ba component in the same composition decreases NOx purification performance (refer to PATENT LITERATURE 6). It is believed that this is because the alkaline earth metal component has action of storing $NO_x$, purification action of NO in the Rh component is interfered, and/or an oxidation Rh structure is stabilized by electron donating action from Ba to Rh.

Therefore, it has been proposed to enhance NOx purification performance and heat resistance, by loading the Rh component and the Ba component onto alumina in a separated state (refer to PATENT LITERATURE 7). In this Literature, there is no description on what degree the Rh component and the Ba component are separated in the catalyst layer. If water-soluble Ba acetate is used as a Ba source, the Ba component dissolves into slurry, and it is not likely that Ba is sufficiently separated from the Rh component. As a result, the Rh component and the Ba component come close, and a problem of decrease in NOx purification performance will not be solved sufficiently.

Thus, there are various combinations of the catalyst components, and complicated reaction routes are taken by interaction of the catalyst components, and thus by overall investigation on these, researchers have been searching a combination of the catalyst components which exerts purification action most.

By the way, the catalyst for purifying exhaust gas may be arranged just one in exhaust gas passage, however, there may be the case where two or more pieces are arranged. This aims at more utilization of characteristics of the catalyst for purifying exhaust gas, in association with stricter exhaust gas regulations, and each optimum position is determined according to durabilities (heat resistance, atmosphere resistance, and poisoning resistance), catalyst characteristics (oxidation activity and reduction activity) or the like which each noble metal of platinum, palladium and Rhodium has.

Also, in order to reduce use of noble metals or rare earth metals leads and to efficiently use limited resources, it has been required to install the catalyst for purifying exhaust gas at the optimum position of exhaust gas passage according to characteristics of each noble metals or rare earth metals.

Still more, regulations on exhaust gas has become more and more severe in recent years, and advent of such a catalyst has been desired that exerts more superior purification performance of exhaust gas, by using a plurality of catalysts. Among the regulations for exhaust gas, that of $NO_x$ has become particularly severer, and thus also in TWC, needs of the catalyst for purifying exhaust gas superior in NOx purification performance has increased.

CITATION LIST

Patent Literature

[PATENT LITERATURE 1]: JP-A-05-237390
[PATENT LITERATURE 2]: JP-B-06-75675
[PATENT LITERATURE 3]: WO2000/027508A1, page 14
[PATENT LITERATURE 4]: JP-A-2007-319768, paragraph 0003
[PATENT LITERATURE 5]: JP-A-03-106446
[PATENT LITERATURE 6]: JP-A-2002-326033, paragraph 0013
[PATENT LITERATURE 7]: JP-A-09-215922

SUMMARY OF INVENTION

Technical Problem

In view of the above conventional problems, it is an object of the present invention to provide the catalyst for purifying exhaust gas for purifying toxic substances contained exhaust gas discharged from an internal-combustion engine of an automobile or the like, by making contacted with the catalyst, in particular, the catalyst for purifying exhaust gas superior in NOx purification performance suitable as TWC.

Solution to Problem

The present inventors have intensively studied a way to solve the above conventional problems and found that nitrogen oxides ($NO_x$) can be efficiently purified without decrease in functions of Rh and Ba, when a catalyst for purifying exhaust gas apparatus is configured for purifying, in particular, $NO_x$, among hydrocarbons (HC), carbon monoxide (CO), and nitrogen oxides ($NO_x$), and through which the exhaust gas is forced to pass, by installing a honeycomb structure carrier coated with specific catalyst composition in a passage of exhaust gas discharged from an internal-combustion engine, because the above-mentioned catalyst component contains barium sulfate, with loaded or not-loaded onto alumina, in a Rhodium-containing layer, and at least a part of Rh is present independently from Ba inside the same catalyst layer, and Rh—Ba deviation rate is specific value, and thus have completed the present invention.

That is, according to a first aspect of the present invention, there is provided a catalyst for purifying exhaust gas containing a Rhodium (Rh)-loaded porous inorganic oxide and barium sulfate ($BaSO_4$), with loaded or not-loaded onto alumina, wherein at least a part of Rh is present independently from Ba inside a catalyst layer, and Rh—Ba deviation rate determined from EPMA analysis is 10% to 80%.

Also, according to a second aspect of the present invention, in the first aspect, there is provided the catalyst for purifying exhaust gas, wherein loaded amount of Rhodium is 0.05 g/L to 2.0 g/L.

In addition, according to a third aspect of the present invention, in the first aspect, there is provided the catalyst for purifying exhaust gas, wherein amount of barium sulfate is 0.5 g/L to 25 g/L, and 0.5 g/L to 15 g/L, in the case of being loaded and not-loaded onto alumina, respectively.

In addition, according to a fourth aspect of the present invention, in the first aspect, there is provided the catalyst for purifying exhaust, wherein loaded amount of barium sulfate onto alumina is 5% by weight to 70% by weight.

In addition, according to a fifth aspect of the present invention, in the first aspect, there is provided the catalyst for purifying exhaust gas, wherein the porous inorganic oxide is one or more kind selected from alumina or zirconia-type composite oxide.

In addition, according to a sixth aspect of the present invention, in the first aspect, there is provided the catalyst for purifying exhaust gas, wherein amount of the porous inorganic oxide is 30 g/L to 180 g/L.

In addition, according to a seventh aspect of the present invention, in the fifth aspect, there is provided the catalyst for purifying exhaust gas, wherein the zirconia-type composite oxide contains one or more kind selected from cerium oxide, lanthanum oxide, neodymium oxide, praseodymium oxide or yttrium oxide, and content thereof is 5% by weight to 50% by weight.

In addition, according to an eighth aspect of the present invention, there is provided the catalyst for purifying exhaust gas, wherein the catalyst layer of the first aspect, is coated onto an integral structure-type carrier.

Still more, according to a ninth aspect of the present invention, according to the eighth aspect, there is provided the catalyst for purifying exhaust gas, wherein the catalyst layer is composed of two or more layers, and one layer thereof contains a Rhodium-loaded porous inorganic oxide and barium sulfate, and the other layer contains the porous inorganic oxide loaded with one or more kind selected from palladium or platinum.

Advantageous Effects of Invention

The catalyst for purifying exhaust gas of the present invention is superior in reduction activity of nitrogen oxides, and exerts high purification performance for nitrogen oxides discharged from various kinds of combustion apparatuses. In particular, it exerts large effect on purification of nitrogen oxides discharged from an internal-combustion engine, in particular, a gasoline engine, because of enhancement of NO purification performance under atmosphere of an insufficient reducing agent such as a CO/NO ratio of 1 or lower, and significant enhancement of purification performance of nitrogen oxides at a temperature range of 200° C. to 700° C. even under variation of CO/NO ratio in exhaust gas.

Still more, the catalyst for purifying exhaust gas of the present invention can produce in low cost because of less used amount of high price active metals, and thus an exhaust gas purification apparatus incorporated with TWC or the like can be produced and supplied stably.

BRIEF DESCRIPTION OF DRAWINGS

FIG. 1A is a graph for explaining a calculation method of Rh—Ba deviation rate, in the catalyst for purifying exhaust gas, and a model drawing of molar fraction distribution of Ba for accumulated % of Rh, in the case where the Rh—Ba deviation rate is 0%.

DESCRIPTION OF EMBODIMENTS

Figure 1B:
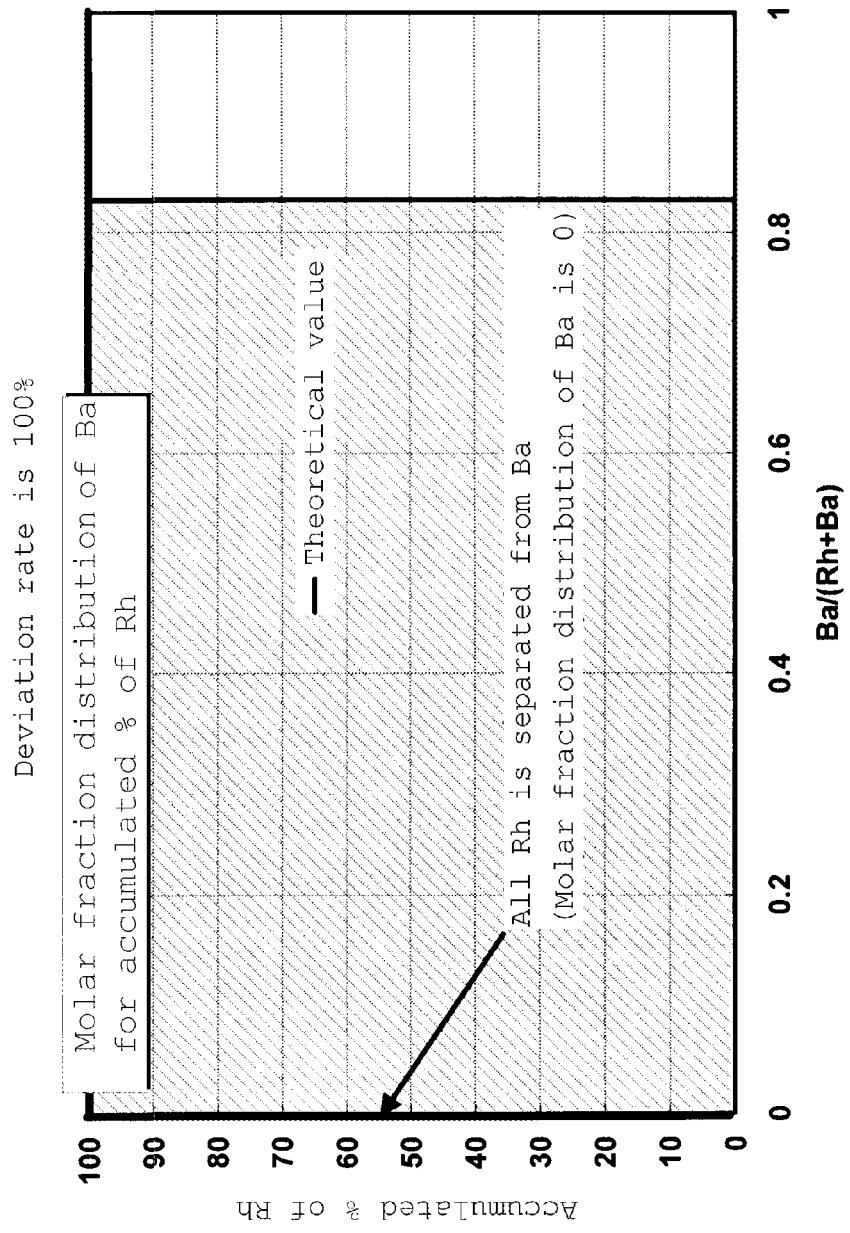
FIG. 1B is a graph for explaining a calculation method of Rh—Ba deviation rate, in the catalyst for purifying exhaust gas, and a model drawing of molar fraction distribution of Ba for accumulated % of Rh, in the case where the Rh—Ba deviation rate is 100%.

Explanation will be given below in more detail on the catalyst for purifying exhaust gas of the present invention and a catalyst apparatus using the same. It should be noted that description will be made mainly on an embodiment in a gasoline engine, however, the present invention is not limited to automotive applications, and it is applicable widely also to denitration technology of nitrogen oxides in exhaust gas.

1. The Catalyst for Purifying Exhaust Gas

The catalyst for purifying exhaust gas of the present invention (hereafter, it may also be referred to as a catalyst composition) is a catalyst for purifying exhaust gas containing a Rhodium (Rh)-loaded porous inorganic oxide and barium sulfate ($BaSO_4$), with loaded or not-loaded onto alumina, and it is characterized in that at least a part of Rh is present independently from Ba inside a catalyst layer, and Rh—Ba deviation rate determined from EPMA analysis is 10% to 80%.

That is, Rhodium (Rh) is loaded on one or more kind of a porous inorganic oxide selected from alumina and composite oxides having zirconium oxide as a main component, and still more barium sulfate is present singly or in a loaded state onto alumina, in an Rh—Ba deviation rate of 10% to 80%.

(1) the Porous Inorganic Oxide

In the present invention, kind of the porous inorganic oxide is not especially limited, and includes a zirconium oxide-type composite oxide, alumina, an alumina-type composite oxide, or ceria. In particular, it is preferable that the porous oxide is composed of one or more kind selected from alumina or a zirconium oxide-type composite oxide.

Among these, it is preferable that the zirconium oxide-type composite oxide is adopted as not a zirconium single component but a composite oxide with a rare earth element or the like. It is because the oxide of the zirconium single component has a problem of low heat resistance. As the rare earth, use of one or more kind selected from Ce, La, Nd, Pr, or Y is preferable. In addition, ratio of the rare earth element occupying in the zirconium oxide-type composite oxide is preferably 5% by weight to 50% by weight, and more preferably 10% by weight to 40% by weight, based on the oxide.

The ratio of the rare earth oxide of less than 5% by weight decreases heat resistance of the zirconium oxide-type composite oxide, and the ratio over 50% by weight may sometimes decrease steam reforming function that the zirconium oxide has.

The zirconium oxide-type composite oxide can be produced by using the pulverized oxide particles obtained by calcining, for example, one or more kind of inorganic or organic zirconium compounds in air at 450° C. to 600° C., as raw material powder, and mixing raw material powder of the rare earth oxide thereto.

(2) Alumina

In the present invention, alumina is one kind of the porous inorganic oxide, and is used together with the zirconium oxide-type composite oxide for loading Rh or Rh and Ba. Other than γ-alumina, there is included β-alumina, δ-alumina, θ-alumina or the like, and alumina having high BET specific surface area is preferable. On the other hand, α-alumina, because of having a small low BET specific surface area of 10 m³/g or smaller, is not preferable as a material, in particular, for loading Ba. BET specific surface area of alumina is preferably 50 m³/g or larger, more preferably 80 m³/g or larger, and still more, particularly preferably 100 m³/g or larger.

(3) Rhodium (Rh)

In the present invention, as an active metal, Rhodium is used, which is a noble metal element superior in purification activity of $NO_x$.

Rhodium is loaded on the above porous inorganic oxide, and as a starting salt to be used in that occasion, Rhodium nitrate, Rhodium chloride, Rhodium acetate, Rhodium sulfate, or the like is preferable. In particular, use of Rhodium nitrate or Rhodium acetate is preferable, which does not leave residue of chlorine or sulfide or the like after calcining.

Loaded amount of Rhodium onto the porous inorganic oxide is preferably 0.05 g/L to 2.0 g/L, and more preferably 0.1 g/L to 1.5 g/L. The amount of Rhodium less than 0.05 g/L abruptly decreases denitration performance, while the amount over 2.0 g/L is not preferable in view of cost, although there is no problem in view of denitration performance.

(4) Barium Sulfate

Barium sulfate (Ba component) is a barium salt which can suppress elution of Ba into slurry. When barium sulfate is repeatedly exposed to high temperature redox atmosphere in exhaust gas over 700° C., it is loaded as a Ba oxide in peripheral configuration material by thermal decomposition or the like, and this Ba oxide becomes to have function for temporarily holding NOx contained in exhaust gas. In addition, NOx held by the Ba component is purified by reduction, by reacting with a reducing component such as carbon monoxide at the Rh component surface.

In the present invention, barium sulfate may be used singly or may be used with being loaded onto an alumina of carrier. As alumina for loading barium sulfate, other than the above-described γ-alumina, alumina having large BET specific surface area can be used preferably, such as β-alumina, δ-alumina, θ-alumina, etc.

Used amount of barium sulfate, in the case of single use, is preferably 0.5 g/L to 15 g/L, more preferably 1 g/L to 10 g/L, in the layer. In addition, in the case where it is loaded onto alumina, it is preferably 0.5 g/L to 25 g/L, more preferably 1 g/L to 20 g/L, in the layer. Used amount within this rage has sufficient function for temporarily storing NOx contained in exhaust gas. However, the amount less than 0.5 g/L may sometimes significantly decrease that function.

In the present invention, by using barium sulfate, such a configuration (deviation arrangement) can be attained that at least a part of Rh is present independently from Ba inside the catalyst layer, however, because barium sulfate decomposes in high temperature of 700° C. or higher and reducing atmosphere, and disperses as a Ba oxide into peripheral configuration material, too high amount of barium sulfate makes the dispersed Ba and Rh come close, and causes decrease in NOx purification performance. To solve this problem, it is desirable that barium sulfate is loaded onto alumina to limit dispersion place at decomposition of barium sulfate. By using barium sulfate-loaded alumina, deviation arrangement from the Rh component is attained, even when the amount of the Ba component is as high as, for example, about 20 g/L, and thus further enhancement of NOx purification performance is expected.

As a method for loading barium sulfate onto alumina, there is included the following methods.

(Process 1)

As a starting salt of barium sulfate, a water-soluble salt such as barium acetate, barium chloride, barium nitrate, barium hydroxide, etc. is prepared. Use of the barium acetate or barium chloride, which has superior water-solubility, is preferable. After making an aqueous solution containing barium, which was prepared by dissolving these barium salts into water, immersed into alumina, it is calcined. After that, sulfuric acid or ammonium sulfate is added, so as to attain a $SO_4/Ba$ ratio of 1 to 2, and it is calcined again.

(Process 2)

Slurry dispersed of barium sulfate and alumina is prepared by adding alumina, barium sulfate and water into a pulverizer such as a beads mill, and performing pulverization and dispersion processing till an average particle diameter of 0.1 μm to 1.0 μm is attained. This mixed slurry is granulated to attain an average particle diameter of 5 μm to 50 μm, by a spray dryer, a fluidized-bed granulation dryer or the like, and calcined.

In this occasion, use of barium sulfate with a primary crystal size of 10 nm to 500 nm, or boehmite, which is a precursor of γ-alumina, makes dispersion easier.

(Process 3)

A barium sulfate dispersion solution is prepared by mixing barium sulfate with a primary crystal size of 10 nm to 500 nm and water, adding an ionic surfactant, dispersing by a mixer. This dispersion solution is immersed and loaded onto alumina powder and calcined.

When barium sulfate is loaded onto alumina, the amount of the barium sulfate loaded onto the alumina is preferably 5% by weight to 70% by weight, and more preferably 10% by weight to 60% by weight.

(5) A Dispersion Aid

In the present invention, the dispersion aid is used in order to widen space between Rh loaded onto porous inorganic oxide and singly present $BaSO_4$ or $BaSO_4$ loaded on alumina, and to improve dispersion property of both. As the dispersion aid, the above described alumina is preferable. In that case, it is preferable that particle diameter of alumina is 1 μm to 50 μm. By adding this dispersion aid, dispersion property of both is enhanced by separating between Rh loaded onto porous inorganic oxide and singly present $BaSO_4$ or $BaSO_4$ loaded on alumina, as well as diffusion of exhaust gas toward the inside of the catalyst layer is promoted.

(6) Rh—Ba Deviation Rate

Inside the catalyst layer of exhaust gas, it is necessary to suppress oxidation of Rh accompanied with electron donating action by Ba, while effectively utilizing $NO_x$ storing capability of Ba by Rh. In order to attain this, it is not preferable that Rh and Ba are too close to or too far apart from the other, and they must distribute by maintaining a certain degree of distance. Because such a distributed state is not determined uniformly by simple physical factors, such as amount or a preparation method of Rh or Ba, kind of a base material, or amount loaded onto the base material, the distributed state has not been calculated, up to now, by a specific mathematical formula.

Therefore, by introducing such a concept as Rh—Ba deviation rate, the present invention determines optimum distance range between Rh and Ba in the catalyst for purifying exhaust gas, suitable as the Three-way Catalyst superior in purification performance of nitrogen oxides (NOx).

That is, in the present invention, Rh—Ba deviation rate is an important index showing to what extent Rh and Ba is independently distributed in the catalyst layer, in other words, to what extent Rh is separated from and arranged relative to Ba.

And, this Rh—Ba deviation rate is calculated from a graph of molar fraction distribution of Ba for accumulated % of Rh, based on analysis result of element distribution of EPMA measurement, shown in FIG. 1A to FIG. 1C, as will be described below in detail.

For example, Rh—Ba deviation rate of 0% indicates complete coincidence of distributions of Rh and Ba, when shown in a diagram of molar fraction distribution of Ba for accumulated % of Rh, all Rh show theoretical value of molar fraction distribution of Ba corresponding to the amount of Rh and Ba, as shown in FIG. 1A. On the other hand, Rh—Ba deviation rate of 100% indicates complete absence of Ba at the place where Rh is present, and shows that all Rh is present at the position where molar fraction distribution of Ba=0. Also, the deviation rate of 50% is defined that 50% of Rh is deviated from Ba (molar fraction distribution of Ba=0), and still more, residual 50% is in coincidental distribution with Ba (molar fraction distribution of Ba=theoretical value). Molar fraction distribution of Ba for accumulated % of Rh at that time is shown as FIG. 1C.

Here, Rh—Ba deviation rate corresponds to area of Rh % (shaded area) for molar fraction distribution of Ba from 0 to theoretical value. In order to calculate Rh—Ba deviation rate S in the catalyst samples, in keeping with FIG. 1A to FIG. 1C, after performing analysis of element distribution by separate EPMA measurement, graph of Rh—Ba molar fraction is drawn as shown in FIG. 2, each relevant area is calculated and then the deviation rate is determined from ratio for the deviation rate of 100%.

In the present invention, Rh—Ba deviation rate is necessary to be set at 10% or higher. It is preferably 10% to 80%, more preferably 10% to 70%, and still more preferably 10% to 60%. In the present invention, the most preferable Rh—Ba deviation rate is 10% to 50%. If Rh—Ba deviation rate is less than 10%, because of the high degree of coincidence of distribution of Rh and Ba, it is difficult for Rh to distribute independently from Ba inside the catalyst layer, which results in making Rh and Ba come close, and thus desired denitration performance is not attained. On the other hand, in order to increase Rh—Ba deviation rate, it is necessary that each particle of Rh and Ba is present uniformly, while maintaining constant distance or more inside the same layer. Therefore, in practical production of a catalyst layer, raising Rh—Ba deviation rate increases restriction in production, resulting in higher production cost and decrease in productivity. Practically, preferable Rh—Ba deviation rate is 10% to 80%, and it is difficult to attain Rh—Ba deviation rate of higher than 80%, in view of catalyst production, as well as EPMA analysis, and in addition, Rh and Ba are too far apart, sufficient denitration performance cannot be obtained.

(EPMA Measurement)

In order to determine Rh—Ba deviation rate, analysis of element distribution by EPMA measurement is performed, in advance, on a catalyst sample (hereafter it may also be referred to simply as a sample). That is, firstly a catalyst (honeycomb) sample is cut out to a size of 10 mm square to prepare a measurement sample. Next, the sample is stuck onto a mold, with making a measurement surface downward, and mixed liquid of a resin and a hardener in a ratio of 10/1.5 is poured, to be cured by standing still overnight. After that, the sample embedded in the resin is polished and subjected to carbon vapor deposition, and pretreatment of the sample is performed.

In the present invention, in the EPMA measurement, an electron probe micro-analyzer JXA-8100, manufactured by JEOL Co., Ltd. should be used. And, the measurement is performed under condition of an acceleration voltage of 15 kV, a radiation current of 0.03 mμA, a pixel size of 0.1 μm, a data sampling time per 1 cell of 200 msec, and a beam diameter of 0.7 μm. Important measurement conditions here are use of the pixel size of 0.1 μm and the beam diameter of 0.7 μm. Because the pixel size and the beam diameter are important conditions to determine resolution of the EPMA measurement, that is, measurement range of one cell, condition outside this loses accuracy of the present measurement result. As a detector, a wavelength dispersion-type detector is used, and line analysis at four places in total is performed for one sample.

(Calculation Method for Molar Fraction Distribution)

Subsequently, intensity values Ii(Rh) and Ii(Ba) of each cell i (i=1 to e) of the $L_\alpha$ line of Rh and the $L_\alpha$ line of Ba, obtained by EPMA measurement, are summed up. Number e of measurement data is about 2000 to 3000, in measurement at four places in total. By taking ratio of total of each intensity values of Rh and Ba as in the following formula (4) and by multiplying ratio Ba/Rh mole ratio, intensity correction coefficient K of Ba intensity to Rh intensity is calculated. Mole amounts of Rh and Ba, n (Rh) and n (Ba), are calculated from each mass ω and molecular weight M, as in the following formula (5). Also, Normalized intensity of Ba, $Ii_{nml}(Ba)$, is calculated, by multiplying intensity correction coefficient K to Ba intensity Ii(Ba), in the following formula (6).

[MATH. 1]

$$K = \frac{\sum_{i=1}^{e} Ii(Rh)}{\sum_{i=1}^{e} Ii(Ba)} \times \frac{n(Ba)}{n(Rh)} \quad (4)$$

$$n(Rh) = \frac{\omega(Rh)}{M(Rh)}, \quad (5)$$

$$n(Ba) = \frac{\omega(BaSO_4)}{M(BaSO_4)}$$

$$Ii_{nml}(Ba) = Ii(Ba) \times K \quad (6)$$

In each cell i, amount of substance of Ba to sum of amount of substance of Rh and Ba, that is, molar fraction of Ba, Yi(Ba), is calculated by the following formula (7), and intensity distribution Ii(Ba) obtained from EPMA measurement is rewritten to molar fraction distribution Yi(Ba).

[MATH. 2]

$$Yi(Ba) = \frac{ni(Ba)}{ni(Rh) + ni(Ba)} = \frac{Ii_{nml}(Ba)}{Ii(Rh) + Ii_{nml}(Ba)} \quad (7)$$

Figure 3:
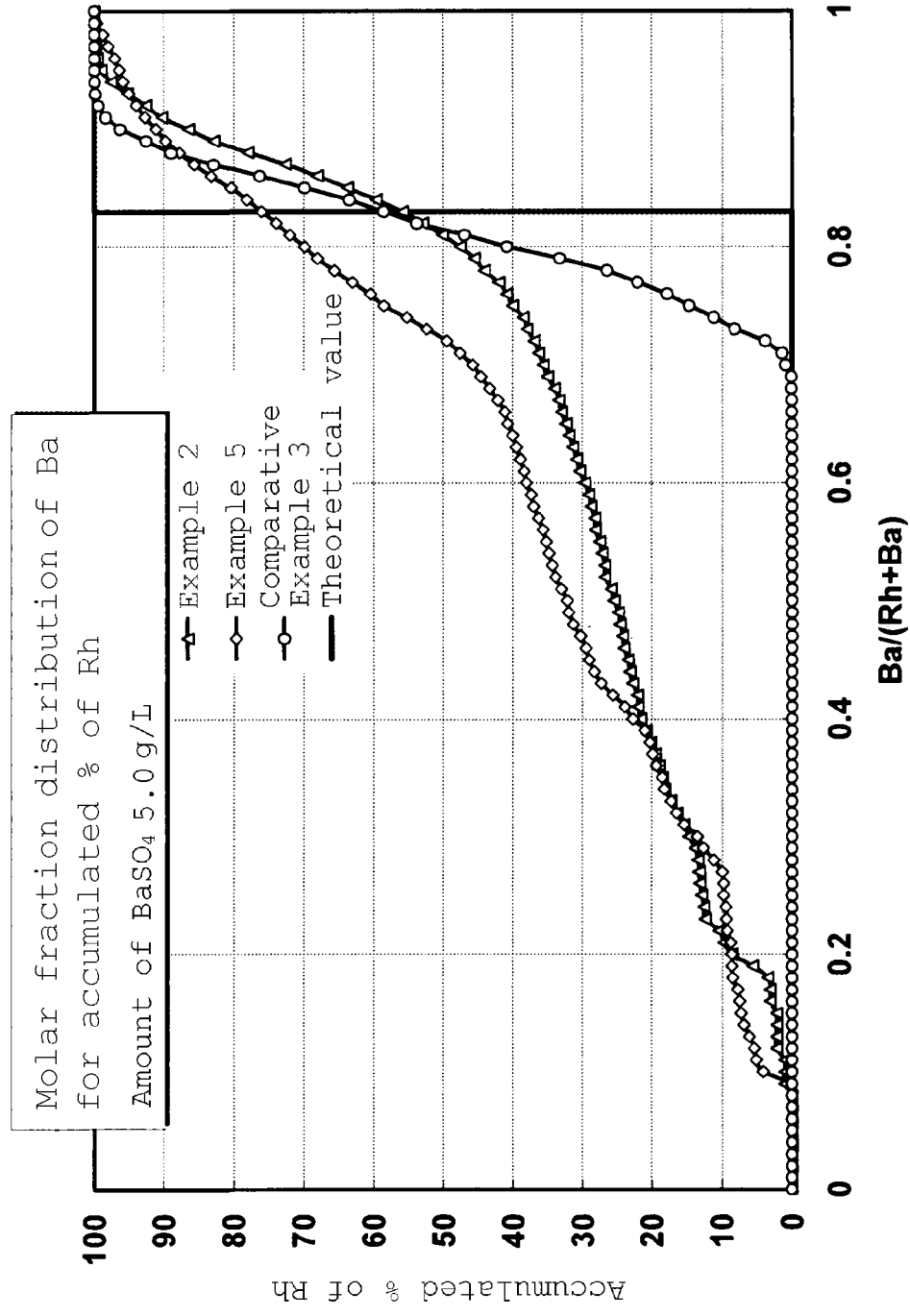
FIG. 3 is a drawing of molar fraction distribution of Ba for accumulated % of Rh, calculated based on EPMA measurement result, in the catalyst for purifying exhaust gas (Example 2, Example 5 and Comparative Example 4) of the present invention.
Figure 4:
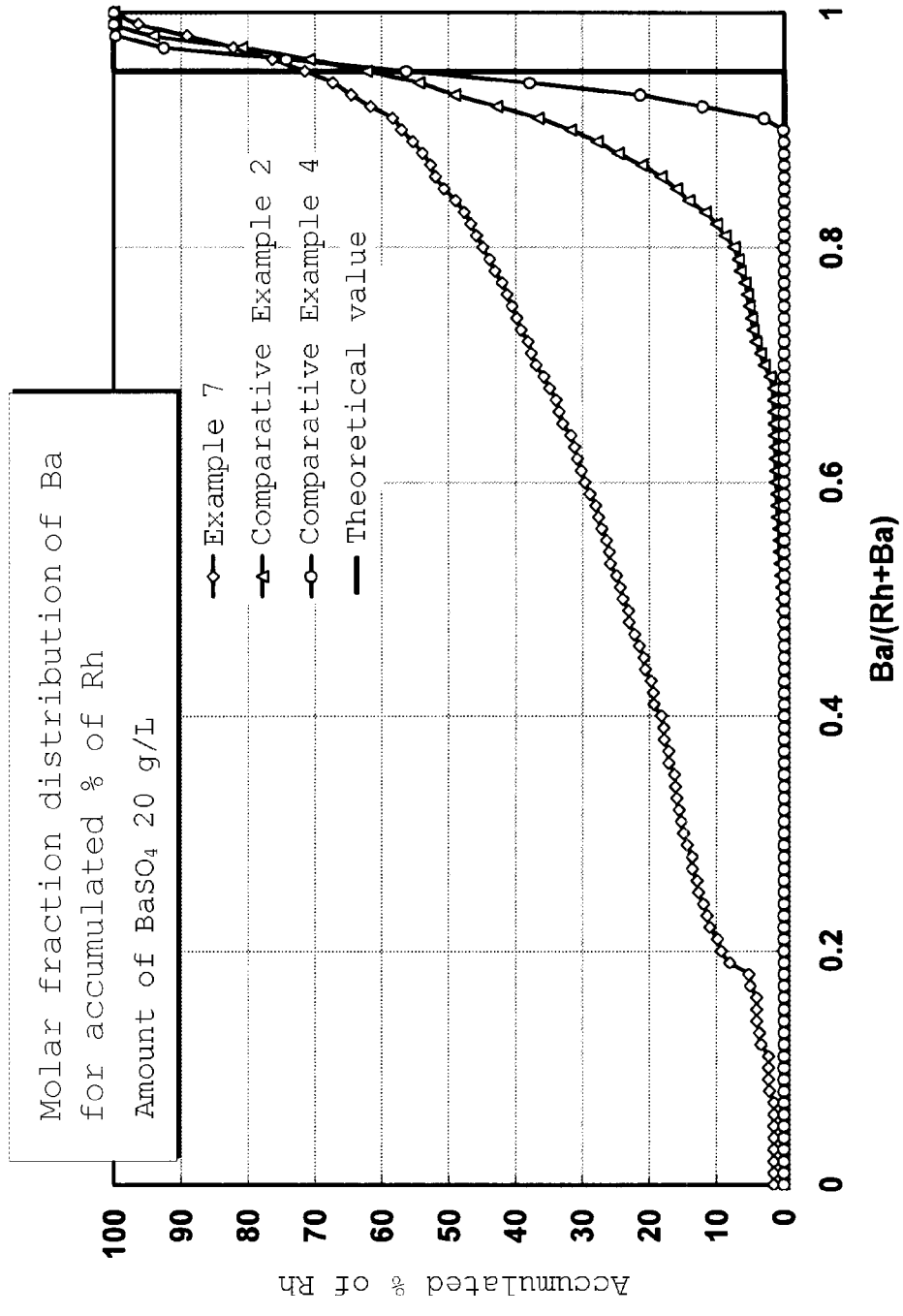
FIG. 4 is a drawing of molar fraction distribution of Ba for accumulated % of Rh, calculated based on EPMA measurement result, in the catalyst for purifying exhaust gas (Example 7, Comparative Example 2 and Comparative Example 4) of the present invention.

By partitioning molar fraction of Ba, Yi(Ba), 0 to 1.0 by each 0.01, Rh intensity $I_{Yi}(Rh)$ of a cell corresponding to a range of specified molar fraction, Yi=k to k+0.01, is added up as shown in the following formula (8). Rh ratio % $P_Y(Rh)$ and accumulated % $C_Y(Rh)$ are determined from its integrated value J. (Rh), using the following formulas (9) and (10). By plotting molar fraction of Ba, Y(Ba), in the horizontal axis and accumulated % of Rh, $C_Y(Rh)$, in the vertical axis, molar fraction distribution of Ba for accumulated % of Rh is illustrated. Molar fraction distribution of Ba for accumulated % of Rh calculated by the present analysis method is shown in FIG. 3 and FIG. 4.

[MATH. 3]

$$J_{Y=k}(Rh) = \sum_{Y=k}^{k+0.01} I_{Yi}(Rh) \quad (8)$$

wherein $0 \le k \le 0.99$ $$P_{Y=k}(Rh) = \frac{J_{Y=k}(Rh)}{\sum_{Y=0}^{1} J_Y(Rh)} \times 100 \quad (9)$$

$$C_{Y=k}(Rh) = \sum_{Y=0}^{k} P_Y(Rh) \quad (10)$$

2. An Integral Structure-Type Catalyst

The catalyst for purifying exhaust gas of the present invention can be used as the structure-type catalyst, where the above catalyst component is coated onto various carrier surfaces. Here, shape of the carrier is not especially limited, and it is selectable from the structure-type carrier such as prism-like, cylinder-like, sphere-like, honeycomb-like, sheet-like. Size of the structure-type carrier is not especially limited, and those having a diameter (length) of, for example, several millimeters to several centimeters can be used, as long as being any one of the prism-like, cylinder-like, or sphere-like one. Among them, use of the honeycomb-like honeycomb structure carrier is preferable.

(Honeycomb Structure Carrier)

The honeycomb structure carrier is the one composed of ceramics such as cordierite, silicon carbide, silicon nitride, or a metal such as stainless steel, and the structure thereof has many parallel fine gas passages extending over the whole structure carrier, and thus may also be referred to as the integral structure-type carrier. As a material among them, cordierite is preferable in view of durability and cost.

As such a honeycomb structure carrier, suitable number of pores at the opening part is also determined, in consideration of kind of exhaust gas to be processed, gas flow rate, pressure drop or removing efficiency or the like, and cell density thereof is preferably 100 cells/inch$^2$ to 900 cells/inch$^2$, and more preferably 200 cells/inch to 600 cells/inch$^2$. The cell density over 900 cells/inch$^2$ tends to generate clogging by adhered PM, while the cell density below 100 cells/inch$^2$ makes geometrical surface area small, causing decrease in effective utilization rate of the catalyst. The cell density means number of cells per unit surface area in cross-section when the honeycomb structure carrier is cut perpendicular to a gas passage.

In addition, as the honeycomb structure carrier, there has been known a flow-through-type structure, where a gas passage is communicated, and a wall-flow-type structure, where a part of end face of the gas passage is sealed, and gas is able to flow through the wall face of the gas passage. The flow-through-type structure provides less air resistance and smaller pressure drop of exhaust gas. In addition, the wall-flow-type structure is capable of filtering off particle-like components contained in exhaust gas. The catalyst for purifying exhaust gas of the present invention can be used in either of structures thereof.

(Layer Configuration)

The integral structure-type catalyst using the catalyst for purifying exhaust gas of the present invention is the one where the above-described catalyst composition is coated onto the honeycomb structure carrier in one or more layers. Layer configuration may be one layer, however, it is preferable to provide two or more layers.

In the case where the catalyst layer is composed of two or more layers, any one layer may be a layer containing the Rhodium-loaded porous inorganic oxide and barium sulfate (Rh layer). And, it is preferable that the Rh layer is configured to be present as an independent layer from a layer containing palladium or the like (Pd layer). It is because, in this way, the Rhodium-loaded porous inorganic oxide superior in reduction activity, and a palladium-containing layer superior in oxidation activity become separate, and each function becomes easy to be exerted.

In the case of a two layer catalyst, it is effective when the outer layer is the Rh layer and the inner layer is Pt or Pd, however, use of the Rh layer in the inner layer and Pt or Pd in the outer layer may be allowed, as long as it does not impair object of the present invention. In addition, in the case of a three layer catalyst, it may be allowed to take such a sandwiched structure that the Rh layer is in the center, and the Pd layers wrap it from both sides.

Used amount of the porous inorganic oxide, that is, the zirconia-type composite oxide or alumina, is preferably 30 g/L to 180 g/L, more preferably 50 g/L to 150 g/L, in the Rh layer. The amount of the porous inorganic oxide below 30 g/L provides insufficient residence of exhaust gas in the Rh layer, which decreases NOx purification performance, while the amount more than 180 g/L may provides heavy catalyst weight, as well as a narrow cell of the honeycomb structure, by which temperature rising characteristics of the catalyst is deteriorated, as well as pressure drop is in increasing tendency.

It should be noted that, in the case where barium sulfate is used by loading onto the porous inorganic oxide such as alumina, loaded amount of barium sulfate is preferably 5% by weight to 70% by weight, and more preferably 10% by weight to 60% by weight.

The loaded amount of barium sulfate onto the porous inorganic oxide less than 5% by weight increases content of the porous inorganic oxide such as alumina, although it does not give influence on denitration performance, provides heavy catalyst weight, as well as a narrow cell of the honeycomb structure. Thereby, temperature rising characteristics of the catalyst is deteriorated, as well as pressure drop is increased, and thus it is not preferable.

(Catalyst Preparation Method)

In order to prepare the integral structure-type catalyst relevant to the present invention, the above-described catalyst composition and a binder, as needed, are mixed with an aqueous medium to make a slurry-like mixture, and then it is coated onto the integral structure-type carrier, and dried and calcined.

That is, firstly, the catalyst composition and the aqueous medium are mixed in a predetermined ratio to obtain the slurry-like mixture. In the present invention, the aqueous medium may be used in such an amount that is capable of dispersing the catalyst composition uniformly in the slurry.

In this occasion, blending of an acid or alkali for pH adjustment, or blending of a surfactant, a resin for dispersion or the like for viscosity adjustment or for enhancement of slurry dispersion, as needed, is allowed. As a mixing method for slurry, pulverization mixing by a ball mill or the like is applicable, however, other pulverization or mixing methods may be applied.

Next, a slurry-like mixture is coated onto the integral structure-type carrier. The coating method is not especially limited, however, a wash coat method is preferable.

By performing drying and calcining after the coating, the integral structure-type catalyst, where the catalyst composition is loaded, is obtained. It should be noted that drying temperature is preferably 70° C. to 150° C., and more preferably 80° C. to 120° C. In addition, calcining temperature is preferably 300° C. to 700° C., and more preferably 400° C. to 600° C. Heating may be performed by known heating means such as an electric furnace or a gas furnace.

3. Catalyst Apparatus Using the Catalyst for Purifying Exhaust Gas

In the present invention, the catalyst apparatus is configured by arranging the integral structure-type catalyst including the above catalyst for purifying exhaust gas in an exhaust system from an engine.

Appropriate position and number of the catalyst in the system treating exhaust gas from an engine can be designed depending on exhaust gas regulations. In a vehicle whose exhaust gas regulation is not severe, it is possible to correspond by one catalyst apparatus, while in a vehicle whose exhaust gas regulation is severe, two catalysts are used, and behind the close coupled catalyst in the exhaust system, the catalyst of the present invention, which is capable of exerting particular effect in denitration performance, can be arranged at the underfloor position.

In this occasion, layer configuration of the catalysts can be determined depending on discharge concentration of $NO_x$ and an operation system, and the Rh single layer catalyst or the multilayer catalyst by Rh and other noble metal can be used as appropriate. In addition, as the other close coupled catalyst, a known catalyst, for example, a catalyst configured by a material such as Pd-loaded alumina, Pd-loaded ceria-zirconia-type composite oxide or the like can be used.

EXAMPLES

Examples and Comparative Examples of the present invention will be shown below, however, the present invention should not be construed as limited to these Examples. It should be noted that Rh—Ba deviation rate of catalyst samples was determined by the following procedure.
(EPMA Measurement)

Analysis of element distribution was performed by EPMA measurement, on samples of Examples and Comparative Examples. A honeycomb sample was cut out to a size of 10 mm square to prepare a measurement sample. The sample is stuck onto a mold, making a measurement surface downward, and mixed liquid of a resin and a hardener in a ratio of 10/1.5 was poured, to be cured by standing still overnight. The sample embedded in the resin is polished, and subjected to carbon vapor deposition and pretreatment of the sample was performed.

In the measurement, an electron probe micro-analyzer JXA-8100, manufactured by JEOL Co., Ltd. was used. The measurement was performed under condition of an acceleration voltage of 15 kV, a radiation current of 0.03 mμA, a pixel size of 0.1 μm, a data sampling time per 1 cell of 200 msec, and a beam diameter of 0.7 μm. As a detector, a wavelength dispersion-type detector is used. Line analysis at four places in total was performed for one sample.
(Calculation Method for Molar Fraction Distribution)

Intensity values $Ii(Rh)$ and $Ii(Ba)$ of each cell i (i=1 to e) of the $L_\alpha$ line of Rh and the $L_\alpha$ line of Ba, obtained by EPMA measurement, were summed up. Number e of measurement data is about 2000 to 3000, in measurement at four places in total. By taking ratio of total of each intensity values of Rh and Ba as in the above-mentioned formula (4) and by multiplying ratio Ba/Rh mole ratio, intensity correction coefficient K of Ba to Rh intensity is calculated. Mole amounts of Rh and Ba, $n(Rh)$ and $n(Ba)$, were calculated from each mass ω and molecular weight M, as in the above-mentioned formula (5). Still more, normalized intensity of Ba, $Ii_{nml}(Ba)$, was calculated, by multiplying intensity correction coefficient K to Ba intensity $Ii(Ba)$, as in the above-mentioned formula (6).

In each cell i, amount of substance of Ba to total amount of substance of Rh and Ba, that is, molar fraction of Ba, $Yi(Ba)$, was calculated by the above-mentioned formula (7), and intensity distribution $Ii(Ba)$ was rewritten to molar fraction distribution $Yi(Ba)$.

Rh intensity $I_{Yi}(Rh)$ of a cell corresponding to a range of specified molar fraction, Yi=k to k+0.01, by partitioning molar fraction of Ba, $Yi(Ba)$, 0 to 1.0 by each 0.01, was added up as shown in the above-mentioned formula (8). Rh ratio % $P_Y(Rh)$ and Rh accumulated % $C_Y(Rh)$ were determined from this integrated value $J_Y(Rh)$ using the above-mentioned formulas (9) and (10). By plotting molar fraction of Ba, Y (Ba), in the horizontal axis and Rh accumulated % $C_Y(Rh)$ in the vertical axis, molar fraction distribution of Ba for accumulated % of Rh was illustrated.
(Calculation of Rh—Ba Deviation Rate)

Rh—Ba deviation rate was calculated from a graph of molar fraction distribution of Ba in Rh.

Figure 1C:
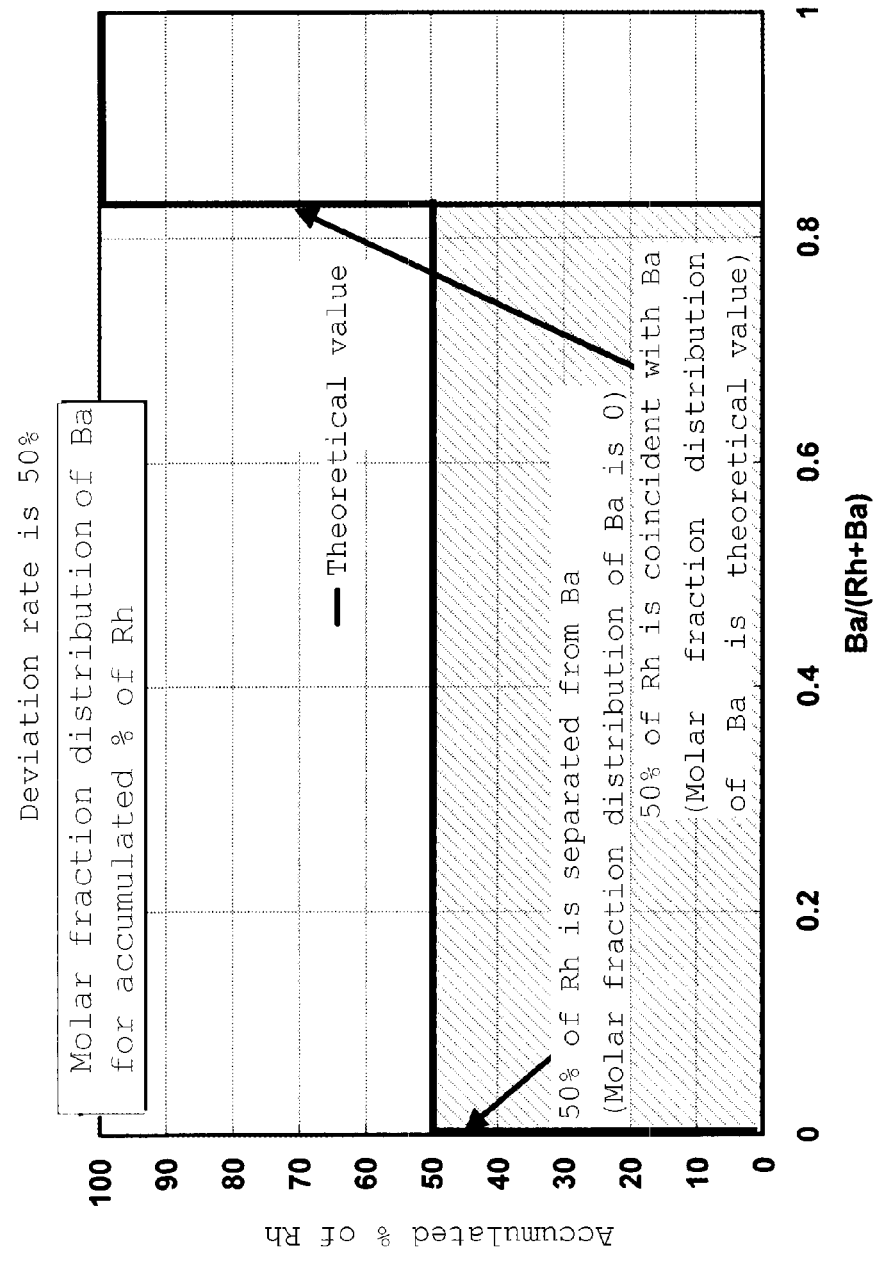
FIG. 1C is a graph for explaining a calculation method of Rh—Ba deviation rate, in the catalyst for purifying exhaust gas, and a model drawing of ideal molar fraction distribution of Ba for accumulated % of Rh, in the case where the Rh—Ba deviation rate is 50%.
Figure 2:
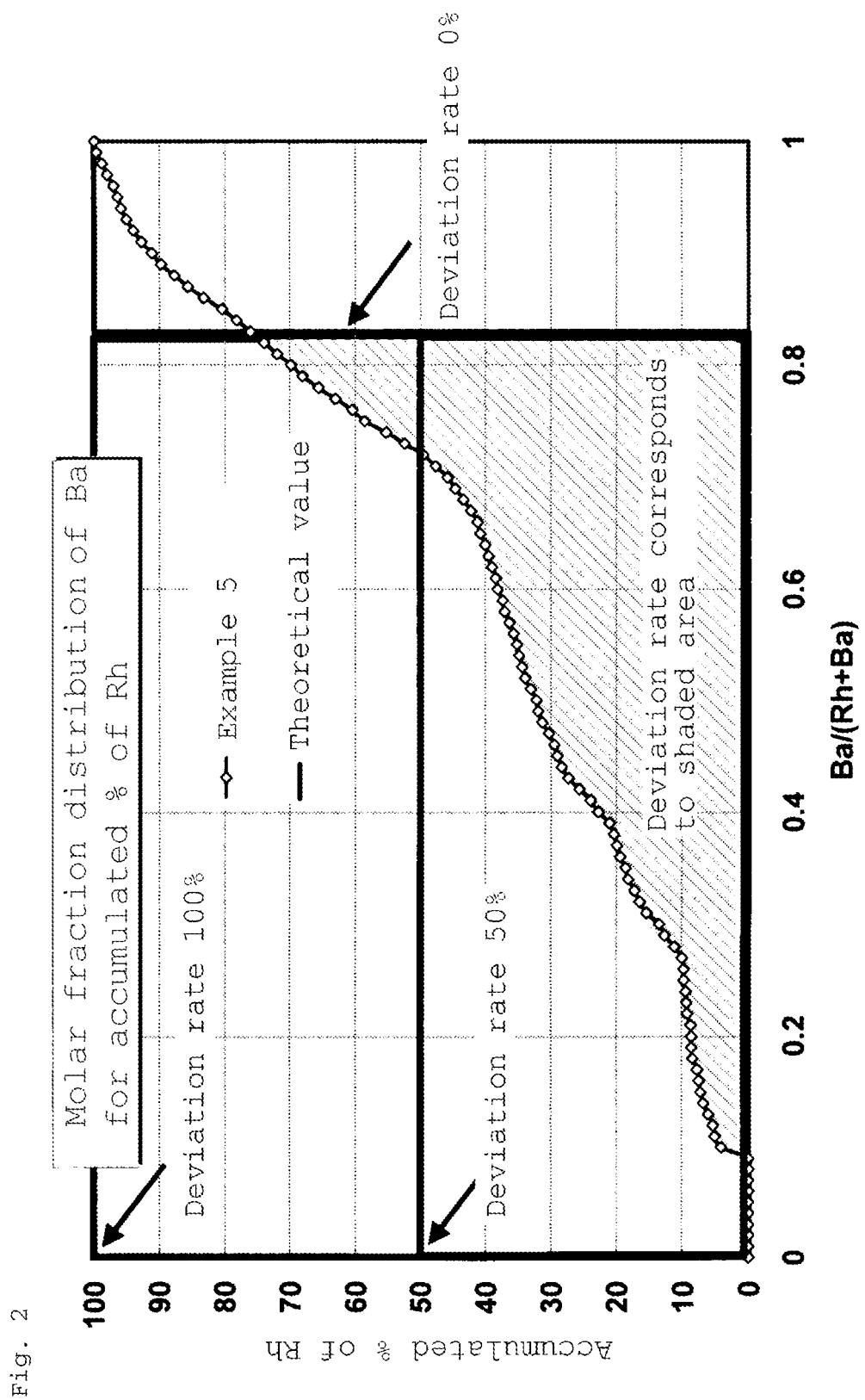
FIG. 2 is a drawing showing an area part corresponding to the Rh—Ba deviation rate from molar fraction distribution of Ba for accumulated % of Rh, in the catalyst for purifying exhaust gas (Example 5) of the present invention.

The graph where Rh—Ba deviation rate is 0%, because of complete coincidence of distributions of Rh and Ba, shows theoretical value of molar fraction distribution of Ba depending on the addition amount of Rh and Ba for all Rh, when drawn molar fraction distribution of Ba in Rh (FIG. 1A). On the other hand, the graph where Rh—Ba deviation rate is 100%, because of complete absence of Ba at the place where Rh is present, shows molar fraction distribution of Ba=0 for all Rh (FIG. 1B). Still more, the graph where the deviation rate is 50%, it is defined that 50% of Rh is completely deviated from Ba (molar fraction distribution of Ba=0), and still more, residual 50% is in complete coincidence with Ba (molar fraction distribution of Ba=theoretical value). Molar fraction distribution of Ba in Rh at that time is shown as FIG. 1C. Here, Rh—Ba deviation rate corresponds to area of Rh % (shaded area) for molar fraction distribution of Ba from 0 to theoretical value.

Thereby, for catalyst samples of Examples and Comparative Examples, each relevant area was calculated from the graph of Rh—Ba molar fraction distribution, and divided by area for the deviation rate of 100% as shown in FIG. 2, to calculate Rh—Ba deviation rate S.

Example 1

Firstly, Rh-loaded $Al_2O_3$ and Rh-loaded $ZrO_2$-type composite oxide, of a catalyst composition, were prepared by the following procedure to form a catalyst layer onto a honeycomb carrier.
<Rh-Loaded $Al_2O_3$>

A Rhodium nitrate solution was weighed in an amount of 2.0 g as Rh weight, diluted with pure water, and then, impregnated and loaded onto 398 g of commercially available γ-alumina powder having a BET specific surface area of 150 $m^2$/g, and an average pore diameter of 15 nm. By calcining this hydrous powder in air at 500° C. for 1 hour, alumina loaded with 0.5% by weight of Rh was prepared.
<Rh-Loaded $ZrO_2$-Type Composite Oxide>

A Rhodium nitrate solution was weighed in an amount of 0.50 g as Rh weight, diluted with pure water, and then, impregnated and loaded onto 500 g of commercially available composite oxide powder made of 5.0% by weight of cerium oxide—5.0% by weight of lanthanum oxide—10.0% by weight of neodymium oxide—80.0% by weight of zirconium oxide, and having a BET specific surface area of 70 $m^2$/g and an average pore diameter of 14.5 nm. By calcining this hydrous powder in air at 500° C. for 1 hour, a zirconia-type composite oxide loaded with 0.1% by weight of Rh was prepared.
<Preparation of Rh Catalyst Layer>

400 g of alumina loaded with 0.5% by weight of Rh, 500 g of zirconia-type composite oxide loaded with 0.1% by weight of Rh, 20 g of commercially available barium sulfate crystal powder, 300 g of the above commercially available γ-alumina, and 1.2 L of pure water were mixed and pulverized in a pot mill to prepare a slurry. By coating this slurry onto a honeycomb carrier made of cordierite, having a volume of 1.0 L (600 cells/$inch^2$, 4 mil), drying at 80° C. for 20 minutes, and then calcining at 450° C. for 1 hour, the Rh catalyst (catalyst weight: 122 g/L, Rh: 0.25 g/L, barium sulfate: 2 g/L, total amount of the porous inorganic oxide of the Rh carrier: 90 g/L) of Example 1 was obtained.

Next, EPMA measurement of Rh—Ba deviation rate of this catalyst sample was performed by the above-described method, and then molar fraction distribution was calculated by the above calculation method, which was 36.0%.

Next, after performing laboratory durability treatment of this catalyst sample by the following method, a catalyst performance test for model gas was performed.
<Laboratory Durability Treatment>

The honeycomb catalyst obtained above was subjected to heat treatment at 900° C. for 3 hours, under gas flow of 10% $H_2/N_2$, in a tube-like furnace made of quartz. Still more, it was subjected to heat treatment at 900° C. for 3 hours in air, in an electric furnace.
<Catalyst Performance Test for Model Gas>

The honeycomb catalyst after the above laboratory durability treatment was cut out to a size of 7 cells×7 cells×7 mL, put into a sample holder for TPD to perform the catalyst performance test using a commercially available TPD reactor (a temperature-programmed desorption gas analysis apparatus). NOx purification performance of the catalyst was investigated under model gas condition as shown in Table 1. Result is shown in Table 2.

TABLE 1

| Flow rate | | 300 ml/min |
|---|---|---|
| SV | | 52,500 hr$^{-1}$ |
| Concentration | CO | 500 ppm |
| of reaction gas | NO | 500 ppm |
| | $CO_2$ | 3.0% |
| | $H_2O$ | 2.0% |
| | He | Balance |
| λ | | 1 |
| Temperature | | 500° C. |

Example 2

By the same preparation method as in Example 1, except that amount of barium sulfate of Example 1 was changed to 50 g, the Rh catalyst (catalyst weight: 125 g/L, Rh: 0.25 g/L, barium sulfate: 5 g/L, total amount of the porous inorganic oxide of the Rh carrier: 90 g/L) of Example 2 was obtained.

Next, after the above-described EPMA measurement on this catalyst sample, Rh—Ba molar fraction distribution was determined, which result is as shown in FIG. 3. From FIG. 3, Rh—Ba deviation rate was calculated and it was 21.0%.

Then, after performing laboratory durability treatment of catalyst sample similarly to Example 1, a catalyst performance test for model gas was performed. Investigation result of NOx purification performance of the catalyst is shown in Table 2.

Example 3

By the same preparation method as in Example 1, except that amount of barium sulfate of Example 1 was changed to 100 g, the Rh catalyst (catalyst weight: 130 g/L, Rh: 0.25 g/L, barium sulfate: 10 g/L, total amount of the porous inorganic oxide of the Rh carrier: 90 g/L) of Example 3 was obtained.

Next, after the above EPMA measurement of Rh—Ba deviation rate of this catalyst sample, it was calculated by a calculation method for molar fraction distribution, which was 17.2%.

Then, after performing laboratory durability treatment of this catalyst sample similarly to in Example 1, a catalyst performance test for model gas was performed. Investigation result of NOx purification performance of the catalyst is shown in Table 2.

Example 4

Slurry was prepared using 50 g of alumina loaded with the following 40% by weight of barium sulfate, instead of 20 g of barium sulfate of Example 1, and changing amount of γ-alumina to 270 g.
<$Al_2O_3$ Loaded with 40% by Weight of $BaSO_4$>
A commercially available barium acetate crystal was weighed in an amount of 260 g, in barium oxide equivalent, then it was dissolved into pure water to prepare an aqueous solution of barium acetate, and then, impregnated and loaded onto 600 g of commercially available γ-alumina powder having a BET specific surface area of 150 m$^2$/g and an average pore diameter of 15 nm. This hydrous powder was calcined in air at 700° C. for 1 hour. Still more, commercially available concentrated sulfuric acid (normality: 36N) (or commercially available ammonium sulfate crystal) diluted with water so as to attain a Ba/S mole ratio of 1/1, was added to this barium-containing powder, which was calcined at 500° C. for 1 hour to prepare alumina loaded with 40% by weight of barium sulfate. The barium component was identified to be barium sulfate from an XRD diffraction peak.

By coating this onto the honeycomb carrier, similarly to in Example 1, the Rh catalyst (catalyst weight: 122 g/L, Rh: 0.25 g/L, barium sulfate: 2 g/L, total amount of the porous inorganic oxide of the Rh carrier: 90 g/L) of Example 4 was obtained.

Next, after the above EPMA measurement of Rh—Ba deviation rate on this catalyst sample, it was calculated by a calculation method for a molar fraction distribution, which was 33.7%.

Then, after performing laboratory durability treatment of the catalyst sample, similarly to in Example 1, a catalyst performance test for model gas was performed. Investigation result of NOx purification performance of the catalyst is shown in Table 2.

Example 5

Using the same preparation method as in Example 4, except by changing amount of alumina loaded with 40% by weight of barium sulfate of Example 4, to 125 g, and amount of γ-alumina to 225 g, the Rh catalyst (catalyst weight: 125 g/L, Rh: 0.25 g/L, barium sulfate: 5 g/L, total amount of the porous inorganic oxide of the Rh carrier: 90 g/L) of Example 5 was obtained.

Next, after the above EPMA measurement on this catalyst sample, Rh—Ba molar fraction distribution was determined, which result is as shown in FIG. 3. Rh—Ba deviation rate was calculated from FIG. 3, and it was 26.7%.

Then, after performing laboratory durability treatment of this catalyst sample, similarly to in Example 1, a catalyst performance test for model gas was performed. Investigation result of NOx purification performance of the catalyst is shown in Table 2.

Example 6

Using the same preparation method as in Example 4, except by changing amount of alumina loaded with 40% by weight of barium sulfate of Example 4, to 250 g, and amount of γ-alumina to 150 g, the Rh catalyst (catalyst weight: 130 g/L, Rh: 0.25 g/L, barium sulfate: 10 g/L, total amount of the porous inorganic oxide of the Rh carrier: 90 g/L) of Example 6 was obtained.

Next, after the above EPMA measurement of Rh—Ba deviation rate on this catalyst sample, it was calculated by a calculation method for Rh—Ba molar fraction distribution was determined, and it was 15.6%.

Then, after performing laboratory durability treatment of this catalyst sample, similarly to in Example 1, a catalyst performance test for model gas was performed. Investigation result of NOx purification performance of the catalyst is shown in Table 2.

Example 7

Using the same preparation method as in Example 4, except by changing amount of alumina loaded with 40% by weight of barium sulfate of Example 4, to 500 g, and amount of γ-alumina to 0 g, the Rh catalyst (catalyst weight: 140 g/L, Rh: 0.25 g/L, barium sulfate: 20 g/L, total amount of the porous inorganic oxide of the Rh carrier: 90 g/L) of Example 7 was obtained.

Next, after the above EPMA measurement on this catalyst sample, Rh—Ba molar fraction distribution was determined, which provided the result as shown in FIG. 4. Rh—Ba deviation rate was calculated from FIG. 4, and it was 25.2%.

Then, after performing laboratory durability treatment of this catalyst sample, similarly to in Example 1, a catalyst performance test for model gas was performed. Investigation result of NOx purification performance of the catalyst is shown in Table 2.

Comparative Example 1

Using the same preparation method as in Example 1, except that amount of barium sulfate of Example 1 was changed to 0 g, the Rh catalyst (catalyst weight: 120 g/L, Rh: 0.25 g/L, barium sulfate: 0 g/L, total amount of the porous inorganic oxide of the Rh carrier: 90 g/L) of Comparative Example 1 was obtained. It should be noted that, because this catalyst sample does not include barium sulfate, and all Rh has molar fraction of Ba=0, Rh—Ba deviation rate becomes 100% theoretically.

Then, after performing laboratory durability treatment of this catalyst sample, similarly to in Example 1, a catalyst performance test for model gas was performed. Investigation result of NOx purification performance of the catalyst is shown in Table 2.

Comparative Example 2

Using the same preparation method as in Example 1, except that amount of barium sulfate of Example 1 was changed to 20 g, the Rh catalyst (catalyst weight: 140 g/L, Rh: 0.25 g/L, barium sulfate: 20 g/L, total amount of the porous inorganic oxide of the Rh carrier: 90 g/L) of Comparative Example 2 was obtained.

Next, after the above EPMA measurement on this catalyst sample, Rh—Ba molar fraction distribution was determined, which result is as shown in FIG. 4. Rh—Ba deviation rate was calculated from FIG. 4, and it was 5.3%.

Then, after performing laboratory durability treatment of the catalyst sample, similarly to in Example 1, a catalyst performance test for model gas was performed. Investigation result of NOx purification performance of the catalyst is shown in Table 2.

Comparative Example 3

Using the same preparation method as in Example 5, except 117 g of alumina loaded with Ba, where barium acetate prepared by the following method was used as a starting salt, was added, instead of alumina loaded with 40% by weight of barium sulfate of Example 5, the Rh catalyst (catalyst weight: 124 g/L, Rh: 0.25 g/L, weight in barium sulfate equivalent: 5 g/L, total amount of the porous inorganic oxide of the Rh carrier: 90 g/L) of Comparative Example 3 was obtained.

Next, after the above EPMA measurement on this catalyst sample, Rh—Ba molar fraction distribution was determined, which result is as shown in FIG. 3. Rh—Ba deviation rate was calculated from FIG. 3, and it was 4.1%.

Then, after performing laboratory durability treatment of the catalyst sample, similarly to in Example 1, a catalyst performance test for model gas was performed. Investigation result of NOx purification performance of the catalyst is shown in Table 2.

<Ba Acetate-Loaded $Al_2O_3$>

A commercially available barium acetate crystal was weighed in an amount in barium oxide equivalent of 260 g, diluted with pure water, and then, impregnated and loaded onto 600 g of commercially available γ-alumina, having a BET specific surface area of 150 $m^2$/g and an average pore diameter of 15 nm. By calcining this hydrous powder in air at 700° C. for 1 hour, Ba-loaded alumina, which barium acetate is a starting salt, was prepared.

Comparative Example 4

Using the same preparation method as in Example 7, except by adding 469 g of Ba-loaded alumina, which barium acetate is a starting salt, instead of alumina loaded with 40% by weight of barium sulfate of Example 7, the Rh catalyst (catalyst weight: 137 g/L, Rh: 0.25 g/L, weight in barium sulfate equivalent: 20 g/L, total amount of the porous inorganic oxide of the Rh carrier: 90 g/L) of Comparative Example 4 was obtained. Next, after the above EPMA measurement on this catalyst sample, Rh—Ba molar fraction distribution was determined, which result is as shown in FIG. 4. Rh—Ba deviation rate was calculated from FIG. 4, and it was 26.7%.

Then, after performing laboratory durability treatment of the catalyst sample, similarly to in Example 1, a catalyst performance test for model gas was performed. Investigation result of NOx purification performance of the catalyst is shown in Table 2.

TABLE 2

| | No. | The 1st catalyst component | The 2nd catalyst component | The 3rd catalyst component | Amount in BaSO4 equivalent (g/L) | Rb—Ba deviation rate (%) | NO purification rate (%) |
|---|---|---|---|---|---|---|---|
| Example | 1 | Rh/$Al_2O_3$ | Rh/$ZrO_2$type | $BaSO_4$ | 2.0 | 36.0 | 57.9 |
| | 2 | Rh/$Al_2O_3$ | Rh/$ZrO_2$type | $BaSO_4$ | 5.0 | 21.0 | 60.3 |
| | 3 | Rh/$Al_2O_3$ | Rh/$ZrO_2$type | $BaSO_4$ | 10.0 | 17.2 | 58.6 |
| | 4 | Rh/$Al_2O_3$ | Rh/$ZrO_2$type | $BaSO_4$/$Al_2O_3$ | 2.0 | 33.7 | 59.4 |
| | 5 | Rh/$Al_2O_3$ | Rh/$ZrO_2$type | $BaSO_4$/$Al_2O_3$ | 5.0 | 26.7 | 66.8 |
| | 6 | Rh/$Al_2O_3$ | Rh/$ZrO_2$type | $BaSO_4$/$Al_2O_3$ | 10.0 | 15.6 | 69.7 |
| | 7 | Rh/$Al_2O_3$ | Rh/$ZrO_2$type | $BaSO_4$/$Al_2O_3$ | 20.0 | 25.2 | 60.1 |
| Comparative Example | 1 | Rh/$Al_2O_3$ | Rh/$ZrO_2$type | — | 0.0 | 100.0* | 49.4 |
| | 2 | Rh/$Al_2O_3$ | Rh/$ZrO_2$type | $BaSO_4$ | 20.0 | 5.3 | 47.3 |
| | 3 | Rh/$Al_2O_3$ | Rh/$ZrO_2$type | Ba acetate/$Al_2O_3$ | 5.0 | 4.1 | 49.2 |
| | 4 | Rh/$Al_2O_3$ | Rh/$ZrO_2$type | Ba acetate/$Al_2O_3$ | 20.0 | 1.3 | 43.7 |

*Theoretical value

[Evaluation]

As is clear from Table 2, as compared with Comparative Example 1, which does not include Ba, any of Examples 1 to 7, which includes barium sulfate, exerts high purification rate of $NO_x$, and thus it is understood that purification activity of $NO_x$ was enhanced by the addition of Ba. On this occasion, because Rh—Ba deviation rate is 10% or higher, it is considered that the Ba component was not present at the very neighborhood of the Rh component. In particular, the cases of Examples 4 to 7, loaded on γ-alumina, exerted high NOx purification performance in a range of barium sulfate of 2.0 g/L to 20 g/L. Reason for this is considered that barium sulfate was deviated from the Rh component by dispersion and immobilization thereof onto alumina, thus attaining both functions of Rh and Ba.

In addition, in the case of Examples 1 to 3, where only barium sulfate was added, good denitration performance was exerted in a range of 2.0 g/L to 10 g/L, however, when amount of barium sulfate is in excess of 20 g/L, as in Comparative Example 2, it is considered that Rh—Ba deviation rate decreased to about 5%, causing also decrease in NOx purification performance, by close location of Ba to Rh. On the other hand, in the case of Comparative Examples 3 and 4, where barium acetate, as a starting salt, was loaded onto alumina, it is considered that barium loaded on alumina was dissolved into slurry on preparation of slurry, causing adhesion of Ba at the neighborhood of Rh, which decreased Rh—Ba deviation rate and also NOx purification performance, caused by close location of Ba to Rh.

In this way, denitration performance near 60 to 70% was able to obtain, by adding barium sulfate loaded on a carrier having high BET specific surface area, represented, in particular, by γ-alumina, even in the case of an Rh single layer catalyst.

Example 8

Firstly, Pd-loaded $Al_2O_3$ and Pd-loaded $CeO_2$—$ZrO_2$-type composite oxide were prepared by the following procedure.
<Pd-Loaded $Al_2O_3$>

A palladium nitrate solution was weighed in an amount of 3.0 g, as Pd weight, diluted with pure water, and then, impregnated and loaded onto 497 g of commercially available γ-alumina powder having a BET specific surface area of 150 m²/g, and an average pore diameter of 15 nm. By calcining this hydrous powder in air at 500° C. for 1 hour, alumina loaded with 0.6% by weight of Pd, was prepared.
<Pd-Loaded $CeO_2$—$ZrO_2$-Type Composite Oxide>

The palladium nitrate solution was weighed in an amount of 1.5 g, as Pd weight, diluted with pure water, and then, impregnated and loaded onto 498.5 g of commercially available composite oxide powder made of 45.0% by weight of cerium oxide—5.0% by weight of lanthanum oxide—50.0% by weight of zirconium oxide, and having a BET specific surface area of 70 m²/g, and an average pore diameter of 16 nm. By calcining this hydrous powder in air at 500° C. for 1 hour, a ceria-zirconia-type composite oxide loaded with 0.3% by weight of Pd, was prepared.

Subsequently, an integral structure-type catalyst for purifying exhaust gas (the first catalyst), where the catalyst layer is composed of two or more layers, and Rh is located at the surface layer (the upper layer: the second layer), was prepared using these powder materials in the following procedure.
<Preparation of the First Catalyst Pd Layer (Lower Layer)>

500 g of alumina loaded with 0.6% by weight of Pd, 500 g of ceria-zirconia-type composite oxide loaded with 0.3% by weight of Pd, 200 g of commercially available γ-alumina, 100 g of commercially available barium sulfate powder, and 1.3 L of pure water were mixed and pulverized in a pot mill to prepare slurry. By coating this slurry onto a honeycomb carrier made of cordierite, having a volume of 1.0 L (600 cells/inch², 4 mil), drying at 80° C. for 20 minutes, and then calcining at 450° C. for 1 hour, the first catalyst Pd layer (lower layer, catalyst weight: 130 g/L, Pd: 0.45 g/L, barium sulfate: 10 g/L) was obtained.
<Preparation of the First Catalyst Rh Layer (Upper Layer)>

Slurry prepared in Example 2, as the first catalyst Rh layer (upper layer, catalyst weight: 125 g/L, Rh: 0.25 g/L, barium sulfate: 5 g/L, total weight of porous inorganic oxides of the Rh carrier: 90 g/L,) was coated onto a honeycomb carrier coated with the above first catalyst Pd layer. In this way, the underfloor two layer catalyst of Example 8 (catalyst total weight: 255 g/L, Rh: 0.25 g/L, Pd: 0.45 g/L, barium sulfate: 15 g/L) was obtained using a series of catalyst preparation method.

After that, the close coupled catalyst configured by the second catalyst of the upper and lower two layers shown below, and the underfloor catalyst configured by the above first catalyst were stored inside a catalyst convertor one by one, and after that installed at close coupled position of an exhaust line of an engine installed at a durability bench, and the underfloor position, respectively. After that, the engine was started for durability processing at 950° C. for 80 hours under variation of A/F. Evaluation was performed by loading each catalyst convertor at the close coupled position and the underfloor position of an evaluation vehicle.
<Second Catalyst Pd Layer (Lower Layer)>

300 g of alumina loaded with 3.0% by weight of Pd, 1200 g of ceria-zirconia-type composite oxide loaded with 1.0% by weight of Pd, 100 g of commercially available barium sulfate powder, and 1.6 L of pure water were mixed and pulverized in a pot mill to prepare slurry. By coating this slurry onto a honeycomb carrier made of cordierite, having a volume of 1.0 L (600 cells/inch², 4 mil), drying at 80° C. for 20 minutes, and then calcining at 450° C. for 1 hour, the second catalyst Pd layer (lower layer, catalyst weight: 160 g/L, Pd: 2.0 g/L, barium sulfate: 10 g/L) was obtained.
<Second Catalyst Pd Layer (Upper Layer)>

400 g of alumina loaded with 3.0% by weight of Pd, 400 g of ceria-zirconia-type composite oxide loaded with 1.0% by weight of Pd, 200 g of commercially available barium sulfate powder, 30 g of commercially available boehmite, and 1.3 L of pure water were mixed and pulverized in a pot mill to prepare slurry. By coating this slurry onto a honeycomb carrier made of cordierite, coated with the above second catalyst Pd layer, drying at 80° C. for 20 minutes, and then calcining at 450° C. for 1 hour, the first catalyst Pd layer (an upper layer, catalyst weight: 130 g/L, Pd: 1.6 g/L, barium sulfate: 20 g/L, total amount of the porous inorganic oxide of the Rh carrier: 90 g/L) was obtained.

The close coupled two layer catalyst (catalyst total weight: 290 g/L, Pd: 3.6 g/L, barium sulfate: 30 g/L) was obtained using a series of catalyst preparation method.

Subsequently, using this catalyst apparatus, a catalyst performance test on an actual machine was performed under the following procedure.
<Catalyst Performance Test for Actual Machine>

Evaluation was performed in a driving mode LA-4. Comparison of NOx purification performance of the catalyst was performed based on average $NO_x$ purification rate in an acceleration region in driving under the LA-4 mode. By extracting the acceleration regions of 189 to 291 seconds and 1566 to 1680 seconds, where an $NO_x$ purification reaction is particularly difficult to proceed, in the driving mode LA-4, that is, the regions having high SV, much $NO_x$ discharge amount, and less CO($CO/NO_x$<1), average $NO_x$ purification rate was calculated, from $NO_x$ discharge amount after passing through the underfloor catalyst, to $NO_x$ discharge amount after passing through the close coupled catalyst. Investigation result of NOx purification performance of the catalyst is shown in Table 3.

Example 9

The underfloor two layer catalyst {catalyst total weight: 255 g/L, Rh: 0.25 g/L, Pd: 0.45 g/L, barium sulfate: 15 g/L, (breakdown: upper layer, catalyst weight: 125 g/L, Rh: 0.25 g/L, barium sulfate: 5 g/L, total amount of the porous inorganic oxide of the Rh carrier: 90 g/L)} of Example 9 was obtained using the same preparation method as in Example 8, except that slurry prepared in Example 5 was used instead of slurry prepared in Example 2.

Next, NOx purification performance of the catalyst was examined by the procedure described in Example 8. The result is shown in Table 3.

Comparative Example 5

The underfloor two layer catalyst {catalyst total weight: 250 g/L, Rh: 0.25 g/L, Pd: 0.45 g/L, barium sulfate: 10 g/L, (breakdown: upper layer, catalyst weight: 120 g/L, Rh: 0.25 g/L, barium sulfate: 0 g/L, total amount of the porous inorganic oxide of the Rh carrier: 90 g/L)} of Comparative Example 5 was obtained using the same preparation method as in Example 8, except that slurry prepared in Comparative Example 1 was used instead of slurry prepared in Example 2.

Next, NOx purification performance of the catalyst was examined by the procedure described in Example 8. The result is shown in Table 3.

Comparative Example 6

The underfloor two layer catalyst {catalyst total weight: 250 g/L, Rh: 0.25 g/L, Pd: 0.45 g/L, barium sulfate: 10 g/L) (breakdown: upper layer, catalyst weight: 124 g/L, Rh: 0.25 g/L, weight in barium sulfate equivalent: 5 g/L, total amount of the porous inorganic oxide of the Rh carrier: 90 g/L)} of Comparative Example 6 was obtained using the same preparation method as in Example 8, except that slurry prepared in Comparative Example 3 was used, instead of slurry prepared in Example 2. Next, NOx purification performance of the catalyst was examined by the procedure described in Example 8. The result is shown in Table 3.

[Evaluation]

As is clear from Table 3, as compared with Comparative Example 5 not including Ba in the Rh layer, or Comparative Example 6, where barium acetate, as a starting salt, was loaded onto alumina, Examples 8 and 9, which include barium sulfate in the Rh layer, exerted superior NOx purification performance, where average purification rate of $NO_x$ in the acceleration region is 90% or higher. In particular, it has been confirmed that Example 9, where barium sulfate was loaded onto alumina, showed such high $NO_x$ purification rate as about 95% in the acceleration region and thus enabled to largely reduce discharge amount of $NO_x$.

It is understood that NOx purification performance is enhanced by arranging with deviation barium sulfate from the Rh catalyst in this way. Still more, by loading barium sulfate on a carrier having high BET specific surface area, represented by γ-alumina, it became possible to deviate the Rh component and the Ba component in a particle level, in the catalyst layer. As a result, both function of Rh and function of Ba can be satisfied, and a catalyst apparatus exhibiting high NOx purification performance was obtained.

INDUSTRIAL APPLICABILITY

Because the catalyst for purifying exhaust gas of the present invention is superior in purification performance of nitrogen oxides in exhaust gas from a gasoline engine, it is optimum as the Three-way Catalyst for purifying nitrogen oxides simultaneously with hydrocarbons and carbon monoxide. However, the present invention is not limited to automotive applications, and it is also widely applicable to denitration technology of nitrogen oxides in exhaust gas.

The invention claimed is:

1. A catalyst for purifying exhaust gas comprising;
a Rhodium (Rh) loaded on a porous inorganic oxide; and
barium sulfate ($BaSO_4$), either loaded or non-loaded on alumina,
wherein at least a part of Rh is present independently from Ba inside a catalyst layer, and Rh—Ba deviation rate determined from EPMA analysis is 10% to 80%,
wherein the catalyst layer is composed of two or more layers, and upper layer thereof comprises a Rhodium-loaded porous inorganic oxide and barium sulfate, and lower layer comprises the porous inorganic oxide loaded with one or more kind selected from palladium or platinum.

2. The catalyst for purifying exhaust gas according to claim 1, wherein loaded amount of Rhodium is 0.05 g/L to 2.0 g/L.

TABLE 3

| | No. | Layer structure | The 1st catalyst component | The 2nd catalyst component | The 3rd catalyst component | average $NO_x$ purification rate in acceleration region |
|---|---|---|---|---|---|---|
| Example | 8 | 2nd layer | Rh/$Al_2O_3$ | Rh/$ZrO_2$type | $BaSO_4$ | 92.3 |
| | | 1st layer | Pd/$Al_2O_3$ | Pd/$CeO_2$—$ZrO_2$type | $BaSO_4$ | |
| | 9 | 2nd layer | Rh/$Al_2O_3$ | Rh/$ZrO_2$type | $BaSO_4$/$Al_2O_3$ | 94.4 |
| | | 1st layer | Pd/$Al_2O_3$ | Pd/$CeO_2$—$ZrO_2$type | $BaSO_4$ | |
| Comparative Example | 5 | 2nd layer | Rh/$Al_2O_3$ | Rh/$ZrO_2$type | — | 88.3 |
| | | 1st layer | Pd/$Al_2O_3$ | Pd/$CeO_2$—$ZrO_2$type | $BaSO_4$ | |
| | 6 | 2nd layer | Rh/$Al_2O_3$ | Rh/$ZrO_2$type | Ba acetate/$Al_2O_3$ | 87.9 |
| | | 1st layer | Pd/$Al_2O_3$ | Pd/$CeO_2$—$ZrO_2$type | $BaSO_4$ | |

3. The catalyst for purifying exhaust gas according to claim 1, wherein amount of barium sulfate is 0.5 g/L to 25 g/L, and 0.5 g/L to 15 g/L, in the case of being either loaded or non-loaded onto alumina, respectively.

4. The catalyst for purifying exhaust gas according to claim 1, wherein loaded amount of barium sulfate onto alumina is 5% by weight to 70% by weight.

5. The catalyst for purifying exhaust gas according to claim 1, wherein the porous inorganic oxide is one or more kind selected from alumina and zirconia-type composite oxide.

6. The catalyst for purifying exhaust gas according to claim 5, wherein the zirconia-type composite oxide comprises one or more kind selected from cerium oxide, lanthanum oxide, neodymium oxide, praseodymium oxide and yttrium oxide, and loaded amount thereof is 5% by weight to 50% by weight.

7. The catalyst for purifying exhaust gas according to claim 1, wherein amount of the porous inorganic oxide is 30 g/L to 180 g/L.

8. The catalyst for purifying exhaust gas according to claim 1, wherein said catalyst layer is coated onto an integral structure-type carrier.

\* \* \* \* \*